United States Patent Office 2,876,238
Patented Mar. 3, 1959

2,876,238

PURIFICATION PROCESS FOR 9α-FLUOROHYDRO-
CORTISONE COMPOUNDS

Robert P. Graber, Elizabeth, and Calvin Stewart Snoddy, Jr., Plainfield, N. J., assignors to Merck & Co., Inc., Rahway, N. J., a corporation of New Jersey No Drawing. Application December 7, 1956
Serial No. 626,811

6 Claims. (Cl. 260—397.45)

This invention relates to the purification of 9α-fluorohydrocortisone and its 21-esters.

This application is a continuation-in-part of our copending application Serial No. 453,414, filed August 31, 1954, now abandoned.

The production of 9α-fluorohydrocortisone (9α-fluoro-4-pregnene-11β,17α,21-triol-3,20-dione) and its 21-esters in high yield is hampered by the difficulty which is encountered in separating these compounds from the various by-products formed during their preparation, and other contaminants which also may be present. The most prevalent impurities or by-products which are present in a crude reaction product, formed in preparing a 9α-fluorohydrocortisone compound, are other steroids or steroid-like substances. The difficulty in recovering all of the 9α-fluorohydrocortisone compound formed is the primary cause of the low yields which have heretofore been obtained in preparing pure 9α-fluorohydrocortisone compounds.

It is an object of the invention to provide a process for the purification of 9α-fluorohydrocortisone compounds.

It is another object to provide such a process whereby the undesirable components of a crude reaction mixture, formed in the preparation of 9α-fluorohydrocortisone compounds, are readily removed.

It is a further object of the invention to provide a purification process for 9α-fluorohydrocortisone compounds which will result in greater yields of these compounds than were heretofore possible.

Other objects and the advantages of the invention will appear hereinafter.

In accordance with the invention, a crude 9α-fluorohydrocortisone compound is purified by first reacting the crude mixture with an acylating agent and then subjecting the resulting acylated crude mixture to a purification procedure such as crystallizing from an organic solvent or chromatographic separation. By the term crude 9α-fluorohydrocortisone compound is meant 9α-fluorohydrocortisone or one of its 21-esters contaminated with other steroidal or steroid-like compounds, which are present, to some degree, in all reaction products formed in the preparation of 9α-fluorohydrocortisone and its 21-esters. The 21-esters of 9α-fluorohydrocortisone are those which have an acyloxy group attached to the 21-carbon atom. The process of this invention is particularly effective with the 21-esters wherein the ester has from one to eight carbon atoms. Typical ester groups which may be present are acetate, propionate, butyrate, benzoate, phenylacetate, t-butyl acetate, p-amino-benzoate, hydrocinnamate, succinate, α-naphthyl-acetate, α-naphthoate and caprylate.

In the preparation of a 9α-fluorohydrocortisone compound a crude mixture is obtained which contains, besides the 9α-fluorohydrocortisone compound, other steroidal substances which may be small quantities of the starting material, as well as other compounds which may be various fluorinated steroids or degradation or rearrangement products. As for example, the 21-esters of 9α-fluorohydrocortisone may be prepared by reacting the corresponding 21-ester of 9β,11β-oxide-4-pregnene-17α,21-diol-3,20-dione with a source of hydrogen fluoride, thereby forming the desired product in admixture with other undesirable steroids, steroid-like substances, and pigments. When the 21-ester of 9β-11β-oxido-4-pregnen-17α,21-diol-3,20-dione is reacted as above indicated with hydrogen fluoride, in addition to the desired 21-ester of 9α-fluorohydrocortisone, there are obtained significant quantities of the corresponding $\Delta^{8(14)}$ compound, $\Delta^{4,8(14)}$-pregnadiene-11,17α,21-triol-3,20-dione, which has been identified as the predominating by-product of this reaction.

The reaction product containing the desired 9α-fluorohydrocortisone compound and the undesired $\Delta^{8(14)}$ compound is acylated with a suitable acylating agent as defined hereinbelow. The desired product, that is, the 9α-fluorohydrocortisone compound, is unaffected by the acylating agent, whereas the undesired $\Delta^{8(14)}$ compound is converted to its 11-acyloxy derivative. While the 9α-fluorohydrocortisone compound and the $\Delta^{8(14)}$ compound have physical properties such that separation of these compounds from each other is extremely difficult, separation of the 9α-fluorohydrocortisone compound from the 11-acyloxy derivative of the $\Delta^{8(14)}$ compound is relatively simple to accomplish by conventional techniques such as crystallization, chromatography, and the like.

The acylation of the crude mixture is carried out by admixing with an acylating agent. Suitable acylating agents are organic acid halides, organic acid anhydrides, ketenes, organic esters, and others, with the acid anhydrides being preferred, the acylating agent containing the acyl residue of an organic carboxylic acid, especially those containing from one to eight carbon atoms, inclusive. Among such acids are formic, acetic, propionic, butyric, valeric, hexanoic, heptanoic, octanoic, cyclopentane-carboxylic, cyclopentylpropionic, benzoic, toluic, oxalic, and the like. Usually an excess of the acylating agent is used. However, any quantity from about the theoretical amount to about 100 times this amount, or even more, is operative, with an excess of about two to about ten times the theoretical amount being preferred. The acylation may be effected in a solvent, such as ethers, chlorinated hydrocarbons or hydrocarbons or the acylating agent may act as the solvent. Typical examples of such solvents are chloroform, benzene and toluene. A small amount of a tertiary amine catalyst such as pyridine, collidine and trimethylamine may be added when an organic acid anhydride or a ketene is the acylating agent and the amine catalyst may also act as the solvent. When organic esters are used it is desirable to use an acid catalyst such as sulfuric acid or p-toluenesulfonic acid. The mixture is heated, usually at about 25° to 100° C., lower or higher temperatures also usually being operative. A reaction period of about one to twenty hours is satisfactory, with a period of about ten to sixteen hours being preferred at room temperature and from five to sixty minutes at 50° C.

The 9α-fluorohydrocortisone compound may be purified in any convenient manner. For example, if most of the acylating agent has been consumed during the reaction, the last traces may be removed under vacuum, the residue dissolved in an organic solvent such as ether, chloroform, and the like, and the resulting solution washed with an aqueous base such as dilute aqueous sodium bicarbonate, sodium carbonate, sodium hydroxide and the like with a dilute aqueous acid to remove any amine catalyst. The washed solution is treated with a drying agent such as sodium sulfate, the solution thus treated filtered to remove the drying agent, the solvent distilled, and the residue crystallized from a suitable solvent such as acetone. Alternately, if the acylating agent has not been consumed, the reaction mixture may be stirred with water or an aqueous base such as aqueous sodium bicarbonate solution to decompose the excess acylating agent. The resulting mixture is extracted with an organic solvent, the organic extract washed with an aqueous base, with a dilute aqueous acid and then with water until neutral and the product isolated from the washed organic solution.

The $9\alpha$-fluorohydrocortisone compound may be crystallized from any of the following solvents: benzene, acetone-petroleum ether, acetone-ether, chloroform-benzene, ethyl acetate-ether and ethyl acetate-petroleum ether.

The acylated crude mixture containing the $9\alpha$-fluorohydrocortisone compound can be purified or the crystalline material obtained by the above procedure can be further purified by adsorbing on an essentially neutral adsorbent material preferably in a column of the chromatographic type, washing the adsorbent material with solvent to develop in the column zones of adsorbent material containing the various components of the crude mixture in differing amounts, and differing degrees of purity, and selectively recovering the $9\alpha$-fluorohydrocortisone compound from said zones of adsorbent material.

Various essentially neutral adsorbents can be utilized in the practice of this invention, including neutral alumina, silica gel, silicic acid, activated carbon, Fluorosil (an adsorbent prepared according to U. S. Patent No. 2,393,625), and the like; neutral alumina having a pH of from 5 to 8 and more preferably 6.5 to 7.5. The adsorbent is preferably contained in a column of the chromatographic type. If desired, the rate of flow of eluting solvent can be modified by adding a material such as filter paper pulp to the adsorbent or by pressure.

In preparing the adsorbent, such as alumina, it is treated so that when washed with water the washes will have a pH of about 5 to about 7. A column is packed with an amount of adsorbent within the range of about 10 to 200 grams, preferably 40 to 50 grams, for each gram of the crude mixture or isolated product to be treated. The column is preferably filled with solvent and dry adsorbent sifted into the solvent until the column is packed.

The crude mixture containing the $9\alpha$-fluorohydrocortisone compound is then dissolved in a non-polar solvent for the mixture to form a concentration of about 2 to 50%. The solution should be as concentrated as possible and the solvent as non-polar as possible. The solution is poured onto the upper surface of the adsorbent in the column, and allowed to flow into the adsorbent either by gravity or under pressure. When the solution of the crude material is all in the adsorbent, fresh solvents not necessarily the same as that originally used, and generally solvents with increasingly higher polarity, are added to the top of the column and allowed to percolate through either by gravity or under slight pressure. After solids appear in the eluate, various fractions of eluate are collected at arbitrary or predetermined intervals. An empirical guide as to the fractions of eluate to be collected can be readily worked out for any particular crude material to be treated by making a few preliminary runs, collecting fractions of eluate at arbitrary intervals and determining the amounts of the desired product in the various fractions. The $9\alpha$-fluorohydrocortisone compound usually remains on the adsorbent until all the major impurities, and most of the pigments, are eluted. The $9\alpha$-fluorohydrocortisone compound is isolated from the collected fractions of eluate by concentrating to dryness and recrystallizing from a solvent such as those mentioned above.

Typical solvents for the crude acylate mixture or crystalline material containing the $9\alpha$-fluorohydrocortisone compound which may be mentioned, are chloroform, chloroform-benzene, acetone-petroleum ether, acetone-ether, chloroform-petroleum ether, ethylene dichloride, carbon tetrachloride and mixtures of these solvents with benzene.

The solvent media used for developing the zones or bands of different compositions in the column of adsorbent include generally solvents of increasing polarity. Examples of suitable solvents are benzene, benzene-chloroform, chloroform, chloroform-ether, ether and the like. It is sometimes advantageous in the adsorption step to employ a solvent medium in which the $9\alpha$-fluorohydrocortisone compound is not too readily soluble in order that better distribution of adsorbate in the column can be obtained before any appreciable amount of the $9\alpha$-fluorohydrocortisone passes from the column. For these purposes benzene, chloroform, ethylene dichloride mixtures of chloroform and benzene or chloroform and ethylene dichloride can be employed.

An alternate procedure for obtaining separate fractions from the column is to drain the column of solvents, divide the adsorbent into separate sections, known or determined to contain optimum or predominant amounts of $9\alpha$-fluorohydrocortisone compound, and then to extract the separated sections with a suitable solvent and isolate the $9\alpha$-fluorohydrocortisone in the manner previously described.

The distribution of bands or sections of adsorbed $9\alpha$-fluorohydrocortisone compound in the column may differ depending upon the composition of the crude mixture containing the $9\alpha$-fluorohydrocortisone being purified. The first fraction of eluate or lower zones, bands or sections of the column usually contain the major impurities, and some of the pigments and later fractions of eluate or higher bands or sections of the column contain predominant amounts of the $9\alpha$-fluorohydrocortisone compound.

It is desirable in all the methods to identify the desired fractions by running paper chromatographs of the various fractions.

It will be understood that the degree of purity or potency of the $9\alpha$-fluorohydrocortisone will depend in large measure upon the care taken in determining the amounts of the different fractions of eluate to be collected or similarly the particular manner in which a column of adsorbent with adsorbed $9\alpha$-fluorohydrocortisone compound is divided for subsequent extraction of separate parts thereof. It will further be understood that by subjecting the $9\alpha$-fluorohydrocortisone compound, recovered from the various eluate fractions to additional selective adsorption and elution treatment, products of higher purity can be obtained.

The following examples are given for purposes of illustration:

Example 1

To an ice-cold solution of 0.572 gram (28.60 millimoles) of anhydrous hydrogen fluoride in 220 ml. of ice-cold alcohol-free chloroform was added an ice-cold solution of 2.88 grams (7.15 millimoles) of $9\beta,11\beta$-oxido - 4 - pregnene - $17\alpha,21$ - diol - 3,20 - dione - 21-acetate in 40 ml. of alcohol-free chloroform. The mixture was allowed to stand at 0° C. for four and one-half hours. Then 100 ml. of water was added, the mixture shaken and the layers separated. Washing with water was continued until neutral, and then the chloroform layer was dried and the chloroform removed in vacuo to afford 3.32 grams of amorphous residue. Alternatively, the final reaction mixture is treated with aqueous sodium acetate solution to neutralize the excess hydrogen fluoride, then washed with water until neutral, and then the chloroform layer dried and the chloroform removed in vacuo to afford the amorphous residue.

Example 2

The 3.32 gram-sample, prepared in Example 1, was acetylated with 10 ml. of pyridine and 10 ml. of acetic anhydride overnight at room temperature. After decomposing the excess acetic anhydride with ice and water, the organic material was extracted with several portions of ethyl acetate. The combined ethyl acetate extracts were washed with water, and dilute hydrochloric acid to remove the pyridine, again with water, then with dilute sodium bicarbonate until the washes were alkaline, finally with water and saturated salt solution, dried, and the solvent removed in vacuo to afford an amorphous residue, weight=3.34 grams. The material was crystallized from chloroform-benzene to afford the product.

Example 3

The 3.34 gram-sample, prepared in Example 2, was chromatographed over 165 grams of an adsorbent comprising about 84% $SiO_2$, 15% MgO and 1% $Na_2SO_4$. The fractions obtained by elution with chloroform and 5% acetone in chloroform were concentrated to dryness and the residues which crystallized on addition of benzene were combined and evaporated to dryness in vacuo, weight=1.278 grams. Recrystallization from chloroform-benzene afforded 1.189 grams of substantially pure 9α-fluorohydrocortisone acetate as the one-half mole benzene solvate, melting point 225°–227° C., soft at 223° C.

Example 4

The crude acetylated product, prepared as in Example 2, was chromatographed over neutral alumina (ca. 40–50 gram/gram acetylated product). The fractions eluted with 50% chloroform-benzene and with chloroform were evaporated to dryness in vacuo. Each residue was analyzed by paper chromatography. The residues containing the 9α-fluorohydrocortisone compound on recrystallization from chloroform-benzene and from acetone-petroleum ether (boiling point 60°–70° C.) afforded the substantially pure product.

Any departure from the above description, which conforms to the present invention, is intended to be included within the scope of the claims.

What is claimed is:

1. A process for purifying a crude mixture containing a 9α-fluorohydrocortisone compound selected from the group consisting of 9α-fluorohydrocortisone and 21-acyloxy derivatives thereof, wherein the acyl group is derived from an organic carboxylic acid containing from one to eight carbon atoms, and a $\Delta^{4,8(14)}$-pregnadiene-11,17α,21-triol-3,20-dione compound selected from the group consisting of $\Delta^{4,8(14)}$-pregnadiene-11,17α,21-triol-3,20-dione and 21-acyloxy derivatives thereof, wherein the acyl group is derived from an organic carboxylic acid containing from one to eight carbon atoms, which comprises: treating the crude mixture with an acylating agent containing the acyl residue of an organic carboxylic acid containing from one to eight carbon atoms, separating the unused acylating agent from the resulting mixture containing unreacted 9α-fluorohydrocortisone compound and the 11-acyloxy derivative of the $\Delta^{4,8(14)}$-pregnadiene-11,17α,21-triol-3,20-dione compound, and crystallizing the 9α-fluorohydrocortisone compound from the resulting mixture containing the acylated $\Delta^{4,8(14)}$-pregnadiene-11,17α,21-triol-3,20-dione compound.

2. The process of claim 1 wherein the 9α-fluorohydrocortisone compound is 9α-fluoro-4-pregnene-11β-17α,21-triol-3,20-dione-21-acetate.

3. The process of claim 1 wherein the acylating agent is a mixture of acetic anhydride and pyridine.

4. A process for purifying a crude mixture containing a 9α-fluorohydrocortisone compound selected from the group consisting of 9α-fluorohydrocortisone and 21-acyloxy derivatives thereof, wherein the acyl group is derived from an organic carboxylic acid containing from one to eight carbon atoms, and a $\Delta^{4,8(14)}$-pregnadiene-11,17α,21-triol-3,20-dione compound selected from the group consisting of $\Delta^{4,8(14)}$-pregnadiene-11,17α,21-triol-3,20-dione and 21-acyloxy derivatives thereof, wherein the acyl group is derived from an organic carboxylic acid containing from one to eight carbon atoms, which comprises: treating the crude mixture with an acylating agent containing the acyl residue of an organic carboxylic acid containing from one to eight carbon atoms, separating the unused acylating agent from the resulting mixture containing unreacted 9α-fluorohydrocortisone compound and the 11-acyloxy derivative of the $\Delta^{4,8(14)}$-pregnadiene-11,17α,21-triol-3,20-dione compound, and separating the 9α-fluorohydrocortisone compound from the resulting mixture containing the acylated $\Delta^{4,8(14)}$-pregnadiene-11,17α,21-triol-3,20-dione compound by chromatographic means.

5. The process of claim 4 wherein the 9α-fluorohydrocortisone compound is 9α-fluoro-4-pregnene-11β-17α,21-triol-3,20-dione-21-acetate.

6. The process of claim 4 wherein the acylating agent is a mixture of acetic anhydride and pyridine.

References Cited in the file of this patent
UNITED STATES PATENTS 2,749,356    Velluz _____ June 5, 1956

OTHER REFERENCES

"Journal of the American Chemical Society," 76, pages 1455–1456 March 1954, Fried et al.